March 9, 1965 F. H. FODOR 3,173,042
SYNCHRONOUS, CONSTANT TORQUE, A.C. MACHINE
Filed June 8, 1961 2 Sheets-Sheet 1
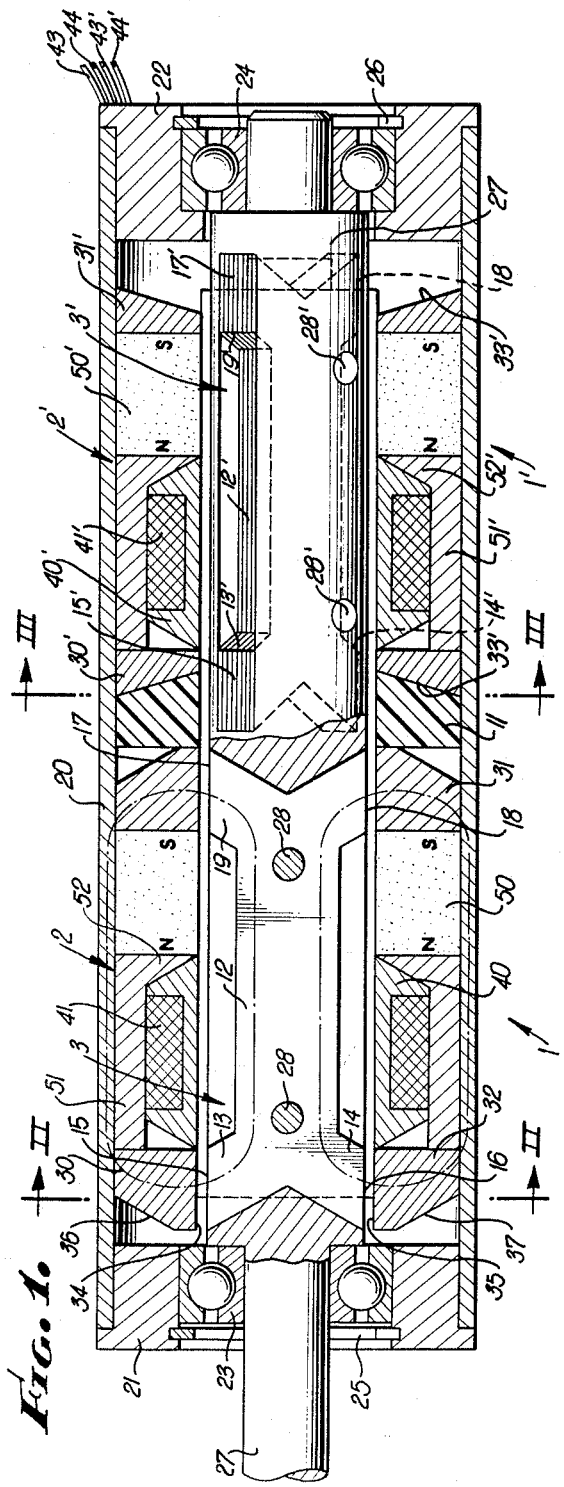
INVENTOR.
FERENZ H. FODOR
BY Miketta and Glenny
ATTORNEYS.

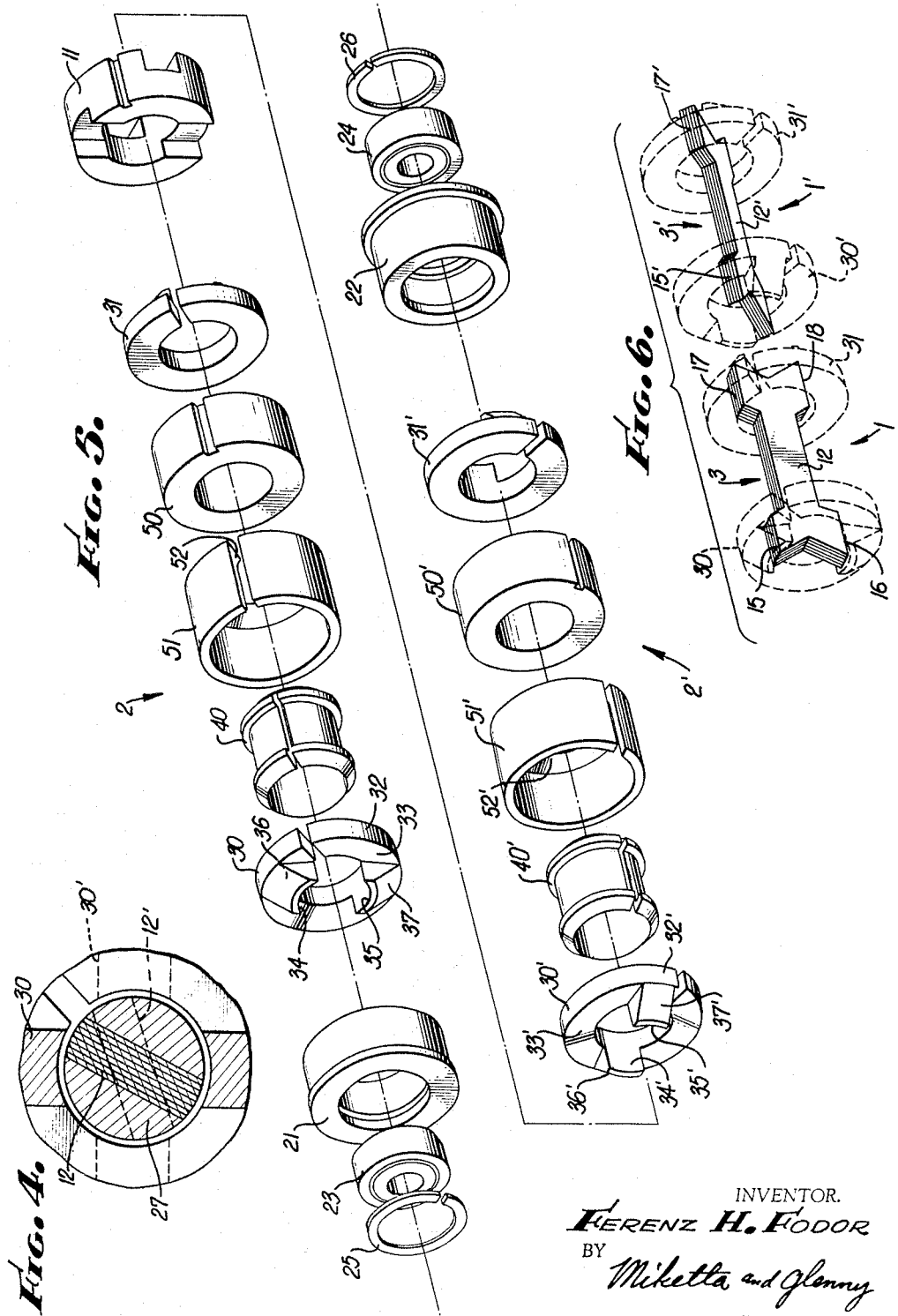

United States Patent Office

3,173,042
Patented Mar. 9, 1965

3,173,042
SYNCHRONOUS, CONSTANT TORQUE, A.C. MACHINE
Ferenz H. Fodor, Los Angeles, Calif., assignor, by direct and mesne assignments, of one-half to Technical Research Products Inc., Los Angeles, Calif., a corporation of Nevada, and one-half to Casimir A. Miketta, Los Angeles, Calif.
Filed June 8, 1961, Ser. No. 115,686
11 Claims. (Cl. 310—112)

This invention relates in general to electric machines which may be operated as motors on alternating current or as synchronous converters changing alternating current into direct current. More particularly, the invention relates to an electric machine having two single phase portions longitudinally arranged with rotor portions on a common shaft, the portions drawing single phase alternating current to each phase portion, electrically out of phase with each other by forty-five degrees. The invention further relates to an extremely small, high speed synchronous motor operable on two phase alternating current with a constant torque for any given current frequency.

Modern high-speed drilling tools employed in the dentistry profession are designed to operate at extremely high speeds, such as one hundred thousand revolutions per minute. I have disclosed such a high speed drilling tool, having very low vibration characteristics, in my copending application for United States Letters Patent, Serial No. 67,811, filed November 7, 1960. It is highly desirable that the motor employed in such a tool be very small, light in weight and capable of operating at a very high r.p.m. as required by the drill. No prior electric motor has the qualities suitable for effective use for my non-vibrational dental tool. Accordingly, I have invented a new and novel electric machine which is extremely small and light in weight (one form being about 9/10 inch in diameter and less than two inches in length) which is capable of shaft speeds of one hundred thousand revolutions per minute. Because of its small size and lightness of weight, the machine is easily transported and readily sterilized, particularly desirable features for a motor used on a dental drilling tool. In addition, the motor does not require an air compressor etc. for cool running at high speeds, is self starting, runs at a constant torque for a given current frequency supplied to it, and is truly synchronous.

Prior electric motors that operate at a constant torque conventionally have been D.C. motors which require commutators, slip rings etc. which cause excessive weight and impede ultra high speed operation. Prior A.C. synchronous motors operating on single and poly-phase current have been heavy, required excessive starting equipment to reduce armature current on starting, or to create a starting torque in single phase A.C. motors. Such motors further require sliding contacts between armature windings and the machine terminals, as by commutators, which do not function well at ultra high speed, as in the case of a D.C. motor running on A.C. current, and frequently require a source of compressed air for cooling purposes.

Generally stated, my invention comprises the provision of two single phase motor portions longitudinally aligned with stationary individual stator portions within a common frame. Rotor laminations, magnetically isolated from each other, are provided for each phase and are disposed in a common rotor shaft. Each phase includes an A.C. field which excites an alternating flux field which, in turn, is concentrated through a magnetic path in the stator portions. Such path includes novel opposed ring pole pieces having pole piece pole surfaces facing the rotor shaft which extends through the pole rings. The rotor shaft is provided with rotor laminations which constitute magnetic paths in the rotor which make a complete magnetic circuit with the stator magnetic paths when the laminations align with the pole piece pole surfaces. Such circuits allow the flow of flux excited by the A.C. field to cause the rotor shaft to rotate. The laminations of the two phases are axially aligned but lie in planes radially out of phase, about their common axis, by forty-five space degrees while the pole pieces of the first and second phase are ninety space degrees out of phase. Thus the rotor laminations of the forward or first phase mechanically lead those of the second phase by forty-five space degrees in coming into alignment with their respective pole piece pole surfaces. The single phase current of the second phase thus provided, lags that of the first phase by forty-five electrical degrees to promote maximum magnetic attraction between the laminations and pole pieces as they come into alignment due to the flux flow caused by the exciting A.C. field.

My invention further comprises, in general, the provision of ceramic permanent magnets in the stator portion of each phase to provide a permanent D.C. field which acts on the rotor laminations to maintain them in a starting position when the stator A.C. fields are not operating. Before the introduction of the ceramic permanent magnets, hard steel, chromium steel, tungsten steel, cobalt-steel alloys and the aluminum-nickel-cobalt steel, called Alnico, were employed as permanent magnets. These magnets were not truly permanent however, in that they could be demagnetized by heating the magnet to a high temperature, by applying a sufficiently strong magnetizing force of reverse polarity or by subjecting it to mechanical vibration for an extended period of time. Alnico exhibited the highest degree of stability or permanence in the face of adverse conditions. An Alnico permanent magnet, however, may not be employed in an electric motor to provide a direct current field where an alternating current field is generated about it. It would be demagnetized and thereafter useless. With the advent of ceramic magnets, I have found that a direct current field may be provided in an electric motor for starting purposes and not be rendered inoperative due to demagnetization of the permanent magnet by the effect of an alternating current field employed thereabout.

It is therefore an object of my invention to disclose and provide an electric machine which is easily manufactured, light in weight and small in size, which may be operated as an ultra high speed A.C. motor, D.C. generator or synchronous converter.

It is another object of my invention to disclose and provide an ultra high speed A.C. motor that is synchronous, operates at a constant torque for a given current frequency and which does not employ slip rings or a commutator on the armature.

It is a further object of my invention to disclose and provide a self starting A.C. electric motor employing two single phase portions longitudinally disposed to each other with rotor portions of each phase magnetically isolated on a common shaft.

It is a still further object of my invention to disclose and provide a construction and arrangement of parts whereby extremely efficient and compact motors and generators may be economically assembled for many technological uses.

Further objects and advantages of my invention will become apparent from a consideration of the following detailed description of an exemplary embodiment of an electric machine according to my invention. Reference will be made to the appended sheets of drawings, in which:

FIG. 1 is an enlarged side elevation of an exemplary electric machine according to my invention with the outer stator portions sectioned along a longitudinal plane passing through the axis and the rotor assembly partially cut away to show the rotor laminations in the forward phase portion, the laminations in the rearward phase portion being shown in phantom lines;

FIG. 2 is a transverse section of the machine of FIG. 1 taken along the plane II—II showing the forward rotor laminations aligned with a forward stator pole piece;

FIG. 3 is a cross-sectional view of the machine of FIG. 1 taken along the plane III—III showing the rotor laminations and a stator pole piece of the rearward phase portion;

FIG. 4 is a cross-sectional view of the stator and rotor portions of the machine of FIG. 1 showing the rotor laminations in a start position;

FIG. 5 is an exploded perspective view of the stator portion of the machine of FIG. 1 showing the forward, first phase on the top row and the rearward, second phase on the bottom row; and FIG. 6 is a schematic representation of the relationship of the rotor laminations of the first and second phases with the stator pole pieces of the two phases.

An exemplary embodiment of an electric machine, according to my invention, is shown in FIGS. 1 through 6. Referring first to FIGS. 1 and 6, it may be seen that the machine is provided essentially in two generally similar portions or phases. A forward portion or first phase, indicated generally at 1, and a rearward portion or second phase, indicated generally at 1'. The first phase 1 includes an outer stator portion, indicated generally at 2 and an inner rotor portion, indicated at 3. The second phase or rearward portion 1' is provided with an outer stator portion, indicated generally at 2' and an inner rotor portion indicated generally at 3'. The stator portions 2 and 2', are similarly constructed but are positioned within the machine mechanically out of phase with each other by ninety space degrees (as will become evident by examining the exploded view of these portions shown in FIG. 5) and are supplied with alternating current forty-five electrical degrees out of phase with each other. The rotor portions, 3 and 3', are axially aligned but mechanically out of phase radially by forty-five space degrees as may be readily seen by examining the FIGS. 2, 3 and particularly 6.

The reasons for the provisions of such forward and rearward stator and rotor portions mechanically out of phase, as noted above, will become apparent subsequently when the operation of the machine is disclosed after the following detail description of its construction.

Referring now to FIG. 1, it should be noted first that the exemplary embodiment of an electric machine, according to my invention, and as there shown, is provided with an outer frame or skeleton 20 which is made of a good magnetic conductive material such as soft iron. Frame 20 is preferably tubular and closed at both ends by the provision of a front end bell 21 and a rear end bell 22. Ball bearings 23 and 24 are provided in the end bells 21 and 22, respectively and are held therein by the front bearing washer 25 and rear bearing washer 26.

A rotor assembly, including the inner rotor portion indicated generally at 3 and 3', is axially mounted within the frame 20 by means of the bearings 23 and 24. The rotor assembly comprises, in general, a non-ferrous, paramagnetic material, shaft 27, preferably made of a dielectric resin composition and two sets of rotor laminations disposed therein in axial alignment but which lie in planes radially out of phase with each other about such common axis by forty-five space degrees. As shown in FIGS. 1 and 6, the laminations are provided in two sets thereof or laminates 12 and 12' in the rotor portions 3 and 3', which are longitudinally spaced and magnetically isolated from each other along the rotor shaft 27. Each laminate 12 and 12' of rotor portions 3 and 3' respectively is preferably composed of eight individual laminations assembled together with a suitable insulating shellac therebetween to reduce eddy current effects between the lamina. The lamina are held in such relation within the rotor assembly shaft 27 by dowels 28, which are made of a paramagnetic material.

The laminates 12 and 12' of rotor portions 3 and 3', as shown in FIG. 1, are preferably disposed within the shaft with only rotor pole surfaces 15, 16, 17, 18 and 15', 16', 17', 18' exposed on the surface of shaft 27. Each rotor lamina of the laminates 12 and 12' respectively is of reduced width in its central portion so that the central portion is disposed entirely within the shaft 27. At either end of each lamina, there is provided a pair of outwardly inclined, opposed pole portions, as portions 13 and 14 in laminate 12, which extend laterally outward of the various laminations, as the pole portions 13' and 14' present pole end surfaces 15' and 16' exposed on the surface of shaft 27, see FIG. 3, generally at 3' in the second phase indicated generally at 1'. The rotor laminations thus each present a path of magnetic conductive material between the pole end surfaces of each lamination within the paramagnetic material shaft 27. A path provided is, for example, from pole end surface 15, through pole portion 13, through the central part of the laminate 12 and then through pole portion 19 to pole end surface 17. In operation, the machine employs such magnetic paths through the paramagnetic material shaft 27 on either side of each set of rotor laminations, indicated generally at 3 and 3'.

Within the frame 20 and about each rotor portion, there is provided the stator portions indicated generally at 2 and 2' separated by a pole piece separator 11 which is made of a non-magnetic material, preferably nylon. Referring to FIG. 1, and particularly to FIG. 5, it may be seen that the outer stator portion 2 or magnetic field portion includes a pair of axially spaced, opposed annular pole pieces 30 and 31. Pole pieces 30 and 31 are made of a magnetic conductive material such as iron or steel and each comprises a split ring portion 32 having a downwardly and inwardly convergent surface 33, inclined from the outer periferal edge. Opposed pole faces 34 and 35, having a concave surface contour, are further provided on each pole piece on portions 36 and 37 thereof which extend parallel to the axis of the ring portion 32 outwardly from the inwardly convergent surface 33. The configuration of the pole pieces, as best shown in FIG. 5, is particularly desirable because of its ability to direct the flow of flux through the poles 36, 37 and 36', 37' of the pole pieces 30, 31 and 30', 31' respectively. The pole faces 34 and 35 of each pole piece 30 and 31 are adapted to align with the rotor lamination opposed pole end surfaces 15, 16 and 17, 18 respectively when the rotor portion 3 or laminate 12 is vertically disposed within the frame 20, as shown in FIG. 2. The rearward stator portion of the second phase, indicated generally at 2' and disposed along the lower portion of the exploded view of FIG. 5, is similar provided with pole pieces 30' and 31' constructed exactly as pole pieces 30 and 31, but, as shown, are turned ninety space degrees thereto.

The pole pieces 30, 31 and 30', 31' of the first and second phase portions of the machine may be press-fitted within the frame 20 and make a complete magnetic path between the rotor laminations indicated generally at 3 and 3' and frame 20 when the respective rotor lamination pole end surfaces 15, 16, 17, 18 and 15', 16', 17', 18' align with the corresponding pole piece surfaces. Such magnetic circuits or paths are shown in dotted line in FIG. 1 in relation to the first phase portion of the machine, indicated generally at 1. A similar magnetic path or circuit is provided in the second phase portion of the machine, indicated generally at 1'. When the rotor laminations 3' or laminate 12' are disposed out of alignment with the pole faces of pole pieces 30' and 31', as shown in FIG. 3, the path is interrupted by a substantial air gap and the flow of flux is impeded. As the pole end surfaces 14', 15', 16' and 17' come into alignment with the pole piece opposed pole faces 34', 35' on each pole piece 30' and 31', the flow of flux increases to a maximum and then reduces to a minimum when they move on out of alignment. The air gap between the rotor lamination pole end surfaces 15, 16, 17, 18 and 15', 16', 17', 18' and the corresponding pole surfaces of the pole pieces 30, 31 and 30', 31', respectively, when they are in register with each other, is preferably maintained between about five thousandths of an inch and about seven thousandths of an inch for best operation.

Each stator portion, indicated generally at 2 and 2', is provided with alternating current field means to drive the rotor portions, indicated generally at 3 and 3'. As shown in FIG. 1 and in the exploded relation of FIG. 5, such means may be provided by positioning a coil spool 40, preferably made of aluminum, having a plurality of turns of copper wire 41 thereon and a similar coil spool 40' having turns of copper wire 41', thereon, within the frame 20 about the rotor laminates 12 and 12' respectively. Each coil spool of spools 40 and 40' may be supplied with single phase alternating current from an appropriate source by known means (including the wires 43, 44 and 43', 44' lying in the slots in the stator portions as shown in FIG. 5) when the machine is employed as a motor, the currents however being out of phase with each other by forty-five electrical degrees and thereby compensating for the disposition of the two rotor portions or laminates forty-five space degrees radially out of phase.

Referring now to FIGS. 1, 4 and 6, it may be seen that if a sinusoidal potential difference is impressed on the stator coil spool turns or winding 41', an exciting current will flow therein causing a sinusoidally expanding and contracting field of flux about the coil spool windings. The field forms expanding and contracting rings of flux flowing at any one instant in the same direction through the center of the spool and outwardly about the outer perifery of the spool in rings of increasing size, the direction of flux flow being alternated with the alteration of the exciting current in the spool windings 41'. The pole pieces 30' and 31' and frame 10 provide a path of least resistance for the flow of flux and therefore tend to concentrate the flux flow therein. The poles 30' and 31' therefore are of different polarity at any one instant and alternate in their polarity with the alteration of the exciting current in the spool windings 41'. As shown in FIG. 6, the rotor laminations indicated at 12' provide a magnetic path and the rotor portion, indicated at 3', will be attracted into alignment with the opposed pole faces of pole pieces 30' and 31' due to the magnetic attraction between rotor pole end surfaces 15', 16' and 17', 18' and the pole piece opposed pole surfaces. Such attraction is caused by the flow of flux directed through the magnetic path of pole pieces 30' and 31', along with frame 20, and the magnetic path provided through the rotor laminate 12' effecting a pair of magnetic circuits, similar to that as shown in dotted line in relation to the first phase indicated at 1 in FIG. 1.

The rotor laminations of laminate 12 of the first phase 1 lead the laminations of laminate 12' of second phase 2 by forty-five space degrees in aligning with their respective pole piece pole surfaces, as can be seen by examining FIG. 6. Accordingly, the alternating current supplied to phase 1, exciting an alternating field of flux therein, is provided to lead the alternating current supplied to phase 2 by forty-five electrical degrees to obtain maximum magnetic attraction between the individual laminations and their respective pole pieces as the shaft 27 rotates. It may be noted that the torque produced by the electric motor, according to my invention, is constant for any current frequency, depending only upon the characteristics of the magnetic material used and nature of the magnetic paths provided. The torque produced by any given motor made according to my invention is therefore proportional to the change in current frequency rather than voltage, contrary to conventional alternating current motors. The motor is truly synchronous and, as a four pole two phase motor, will operate at 1800 r.p.m. on 60 cycle current, 3600 r.p.m. on 120 cycle current, etc. It therefore has the characteristics of a D.C. motor but does not require breakers, slip rings and so forth. I have found it to be very desirable to employ a conventional variable frequency power pack with my machine when using it as a high speed motor and have obtained shaft speeds of one hundred thousand revolutions per minute.

Starting of the electric machine as a motor, according to my invention, is facilitated by novel starting means. It would be possible for the rotor laminations of the machine, as previously described, to stop in a position where the rotor pole surfaces are separated by a substantial air gap from the pole piece pole surfaces whereby the motor would not start upon excitation of the field current. I have therefore provided a permanent magnet in each stator portion which maintains a direct current magnetic field in each phase portion acting upon the stopped rotor shaft 27 to position it in a start position.

The stator portions, indicated generally at 2 and 2' are each provided with a permanent magnet 50 and 50', respectively, in the form of a ring of ceramic magnetic material. The ceramic permanent magnets provided are magnetized in the direction of their axes so that the annular side surfaces are the pole faces, opposite faces being of opposite polarity. The permanent magnets 50 and 50' are provided within the frame 20, as shown in FIG. 1. Cylindrical pole pieces 51 and 51' are also provided within the frame 20, one in each stator portion, to provide a magnetic path for the permanent magnet field produced by the permanent magnets 50 and 50'. Cylindrical pole pieces 51 and 51' each abut at one end at a stator pole piece overlying the coil spools 40, 40' and windings 41, 41' respectively, as cylindrical pole piece 51 and 51' abut against pole piece 30 and 30', in FIG. 1, respectively. As shown in FIG. 1, each of the cylindrical pole pieces 51 and 51' also have an inwardly directed flange portion 52 and 52' which abuts against the ridge surface of the permanent magnets 50 and 50' respectively. Since the side surfaces of the magnets are magnetic poles, magnetic paths are provided through the magnets, cylindrical pole pieces and pole pieces respectively, causing the laminations in each phase portion to be attracted to a position of alignment with their respective pole piece pole surfaces.

The rotor shaft 27 therefore will always assume a stopped position where the attraction of the individual rotor laminations of phase one to the pole pieces of phase one balances the attraction of the rotor laminations of phase two to the pole pieces of phase two. Such positioning of the laminations is accomplished by the presence of the permanent magnets 50 and 50' which urge shaft 27 into a position where each lamination is as nearly aligned with its pole piece pole surfaces as possible, in view of the positioning of the other and is ready for starting upon excitation of the alternating current field, as in the position shown in FIG. 4.

The machine according to my invention may also be used as a direct current generator. If the rotor shaft 27 is rotated by supplying alternating current to the field of the first phase portion only, the rotation of the rotor laminations in the second phase portion through the field of flux provided by the permanent magnet 50', will cause a direct current to flow through the second phase field windings 41' and allow a D.C. current to be drawn off.

Although the example given herein illustrates the invention as embodied in a very compact, small motor, it is to be understood that the advantages of the construction described can also be embodied in large motors.

While I have disclosed and described in detail herein only a single exemplary embodiment of a synchronous, constant torque, A.C. machine according to my invention, it should be understood that additional embodiments, alterations and modifications may be made within the scope of my invention as defined by the following claims.

In particular, it should be noted that the machine, according to my invention, may be operated either as a motor or generator, that it may be provided with any number of phases more than one and may be provided with any number of poles more than four.

What I claim as new and desire to protect by Letters Patent is:

1. In a high speed synchronous motor having a constant torque for a given current frequency, the provision of: a forward first phase portion and a rearward second phase portion disposed longitudinally along a common axis within a frame of magnetic conductive material, said second phase portion being rotated ninety space degrees about said axis to said first phase portion: each phase portion comprising; an outer stator portion having an alternating current field means adapted to excite an alternating field of magnetic flux, said stator portion further providing a magnetic path for said flux, and an inner rotor portion magnetically isolated from the other rotor portion having a plurality of laminations of magnetic material providing a magnetic path therethrough, the inner rotor portion of the forward first phase being out of phase with the inner rotor portion of the rearward second phase by forty-five space degrees measured radially about a common axis.

2. A high speed synchronous machine having a forward first phase portion and a rearward second phase portion longitudinally disposed to each other on a common axis within a frame with single phase A.C. current supplied to the first phase portion forty five electrical degrees out of phase with that supplied to the second, comprising: a tubular frame of magnetic material, a pair of stator portions longitudinally disposed therein on a common axis, said stator portions each providing a magnetic path and being positioned at 90° with respect to each other about said common axis, and a rotor assembly axially mounted within said frame and passing through said pair of stator portions, said rotor assembly including a shaft of paramagnetic material and a plurality of laminations of magnetic material disposed therein in two sets of lminations, said two sets of laminations being magnetically isolated from each other and defining planes radially out of phase with each other by forty-five degrees about a major axis of said rotor shaft, said stator portions each including alternating current field means and a permanent magnet in association with said magnetic paths provided by said stators.

3. A high speed synchronous machine having a forward first phase portion and a rearward second phase portion longitudinally disposed to each other on a common axis within a frame and supplied with single phase A.C. current to said first phase forty-five electrical degrees out of phase with single phase A.C. current supplied to said second phase portion, comprising: a tubular frame of magnetic material, a pair of stator portions longitudinally disposed within said frame on a common axis, said stator portions being ported through a central zone thereof and turned radially about said common axis to each other by ninety space degrees, each stator portion having alternating current field means adapted to excite an alternating field of magnetic flux and means for providing a magnetic path therein for said flux, said means including a pair of axially spaced opposed annular pole pieces, and a rotor assembly axially mounted within said frame through said ported stator portions including a rotor shaft of paramagnetic material and a plurality of rotor laminations set therein, said laminations being disposed within said shaft in two sets of laminations magnetically isolated from each other and defining planes longitudinally disposed along said shaft intersecting the axis of said shaft, said two sets of laminations being further disposed within said shaft radially out of phase with each other about said axis of said shaft by forty-five space degrees.

4. A high speed two phase four pole synchronous electrical motor employing ceramic permanent magnets to position a rotor shaft in a start position and alternating current field means to turn the rotor, comprising: a tubular housing of magnetic material; a rotor assembly axially mounted within said housing including a plurality of rotor laminations of magnetic material and a rotor shaft of paramagnetic material, said laminations providing plurality of magnetic paths through said rotor shaft; and a pair of stator assemblies disposed longitudinally along a common axis within said tubular housing and turned to each other by ninety space degrees about said common axis, said stator assemblies each being provided with means to provide a magnetic path therethrough, each stator assembly including alternating current field means adapted to excite an alternating, pulsating field of magnetic flux in the region of said magnetic paths provided by an associated stator assembly and rotor laminate, each stator assembly further having a permanent magnet operably associated with the magnetic paths provided in said stator assembly to constantly urge flux flow through said stator assembly in a single direction.

5. A high speed two phase four pole synchronous electrical motor employing ceramic permanent magnets to position a rotor shaft in a start position and alternating current field means to turn the rotor, comprising: a tubular housing of magnetic material; a rotor assembly axially mounted within said housing including a plurality of rotor laminations of magnetic material and a rotor shaft of paramagnetic material, said rotor laminations being disposed in said shaft in groups forming planar rotor laminates, said laminates being magnetically isolated from each other within said shaft of paramagnetic material, and out of phase with each other about a common central axis by forty five space degrees measured radially about said central axis; and a pair of stator assemblies disposed longitudinally along a common axis within said tubular housing and turned to each other by ninety space degrees about said common axis, said stator assemblies each being provided with means to provide a magnetic path therethrough, each stator assembly including alternating current field means adapted to excite an alternating, pulsating field of magnetic flux in the region of said magnetic paths provided by an associated stator assembly and rotor laminate, each stator assembly; further having a permanent magnet operably associated with the magnetic paths provided in said stator assembly to constantly urge flux flow through said stator assembly in a single direction.

6. A motor as in claim 5 wherein said alternating current field means includes a spool traverse to and encircling said rotor shaft, said spool being wound with a plurality of turns of electrically conductive wire, and wherein said permanent magnet associated with the magnetic paths of each stator assembly is a ring permanent magnet of ceramic material magnetized in the direction of its axis and presents opposed generally flat annular pole surfaces magnetically associated with said pole pieces and providing said pole pieces with a constant, opposite polarity to position said rotor in a start position when said alternating current field means is not excited.

7. A high speed two phase four pole synchronous electrical motor employing ceramic permanent magnets to position a rotor shaft in a start position and alternating current field means to turn the rotor, comprising: a tubular housing of magnetic material; a rotor assembly axially mounted within said housing including a plurality of rotor laminations of magnetic material and a rotor shaft of paramagnetic material, said rotor laminations being disposed in said shaft in groups forming planar rotor laminates, said laminates being magnetically isolated from each other within said shaft of paramagnetic material, said laminations having opposed rotor pole end surfaces exposed on the surface of said rotor shaft at both ends of each laminate and a reduced width central portion lying entirely within said shaft, said laminates providing a plurality of magnetic paths through said rotor shaft between said pole and surfaces at said both ends of each laminate, said laminates defining planes through a central axis of said rotor shaft that are forty-five space degrees radially out of phase with each other, and a pair of stator assemblies disposed longitudinally along a common axis within said tubular housing and turned to each other by ninety space degrees about said common axis, said stator assemblies each being provided with means to provide a magnetic path therethrough, each stator assembly including alternating current field means adapted to excite an alternating, pulsating field of magnetic flux in the region of said magnetic paths provided by an associated stator assembly and rotor laminate, where said alternating current field means includes a spool traverse to and encircling said rotor shaft, said spool being wound with a plurality of turns of electrically conductive wire, each stator assembly further having a permanent magnet operably associated with the magnetic paths provided in said stator assembly to constantly urge flux flow through said stator assembly in a single direction.

8. A high speed two phase four pole synchronous electrical motor employing ceramic permanent magnets to position a rotor shaft in a start position and alternating current field means to turn the rotor, comprising: a tubular housing of magnetic material; a rotor assembly axially mounted within said housing including a plurality of rotor laminations of magnetic material and a rotor shaft of paramagnetic material, said rotor laminations being disposed in said shaft in groups forming planar rotor laminates, said laminates being magnetically isolated from each other within said shaft of paramagnetic material, said laminations having opposed rotor pole end surfaces exposed on the surface of said rotor shaft at both ends of each laminate and a reduced width central portion lying entirely within said shaft, said laminates providing a plurality of magnetic paths through said rotor shaft between said pole end surfaces at said both ends of each laminate, said laminates defining planes through a central axis of said rotor shaft that are forty-five space degrees radially out of phase with each other, and a pair of stator assemblies disposed longitudinally along a common axis within said tubular housing and turned to each other by ninety space degrees about said common axis, said stator assemblies each being provided with means to provide a magnetic path therethrough, each stator assembly including alternating current field means adapted to excite an alternating, pulsating field of magnetic flux in the region of said magnetic paths provided by an associated stator assembly and rotor laminate, wherein said alternating current field means includes a spool traverse to and encircling said rotor shaft, said spool being wound with a plurality of turns of electrically conductive wire, said magnetic paths of each stator assembly including a pair of spaced, opposed annular pole pieces axially aligned to each other and adapted to receive said rotor shaft therethrough, said pole pieces each having a pair of opposed, concave pole piece surfaces, adapted to align with a pair of said opposed rotor pole end surfaces exposed on the surface of said rotor shaft, each stator assembly further having a permanent magnet operably associated with the magnetic paths provided in said stator assembly to constantly urge flux flow through said stator assembly in a single direction.

9. A high speed two phase four pole synchronous electrical motor employing ceramic permanent magnets to position a rotor shaft in a start position and alternating current field means to turn the rotor, comprising: a tubular housing of magnetic material; a rotor assembly axially mounted within said housing including a plurality of rotor laminations of magnetic material and a rotor shaft of paramagnetic material, said rotor laminations being disposed in said shaft in groups forming planar rotor laminates, said laminates being magnetically isolated from each other within said shaft of paramagnetic material and out of phase with each other about a common central axis by forty-five space degrees measured radially about said central axis, said laminations having opposed rotor pole end surfaces exposed on the surface of said rotor shaft at both ends of each laminate and a reduced width central portion lying entirely within said shaft; and a pair of stator assemblies disposed longitudinally along a common axis within said tubular housing and turned to each other by ninety space degrees about said common axis, said stator assemblies each being provided with means to provide a magnetic path therethrough, each stator assembly including alternating current field means adapted to excite an alternating, pulsating field of magnetic flux in the region of said magnetic paths provided by an associated stator assembly and rotor laminate, said magnetic paths of each stator assembly including a pair of spaced, opposed annular pole pieces axially aligned to each other and adapted to receive said rotor shaft therethrough, said pole pieces each having a pair of opposed, concave pole piece surfaces, adapted to align with a pair of said opposed rotor pole end surfaces exposed on the surface of said rotor shaft, and each stator assembly further having a permanent magnet operably associated with the magnetic paths provided in said stator assembly to constantly urge flux flow through said stator assembly in a single direction.

10. A high speed two phase four pole synchronous electrical motor employing ceramic permanent magnets to position a rotor shaft in a start position and alternating current field means to turn the rotor, comprising: a tubular housing of magnetic material; a rotor assembly axially mounted within said housing including a plurality of rotor laminations of magnetic material and a rotor shaft of paramagnetic material, said rotor laminations being disposed in said shaft in groups forming planar rotor laminates, said laminates being magnetically isolated from each other within said shaft of paramagnetic material, said laminates defining planes through a central axis of said rotor shaft that are forty-five space degrees radially out of phase with each other; and a pair of stator assemblies disposed longitudinally along a common axis within said tubular housing and turned to each other by ninety space degrees about said common axis, said stator assemblies each being provided with means to provide a magnetic path therethrough, each stator assembly including alternating current field means adapted to excite an alternating, pulsating field of magnetic flux in the region of said magnetic paths provided by an associated stator assembly and rotor laminate.

11. A high speed two phase four pole synchronous electrical motor employing ceramic permanent magnets to position a rotor shaft in a start position and alternating current field means to turn the rotor, comprising: a tubular housing of magnetic material; a rotor assembly axially mounted within said housing including a plurality of rotor laminations of magnetic material and a rotor shaft of paramagnetic material, said rotor laminations being disposed in said shaft in groups forming planar rotor laminates, said laminates being magnetically isolated from each other within said shaft of paramagnetic material, said laminates providing a plurality of magnetic paths through said rotor shaft between said pole end surfaces at said both ends of each laminate, said laminates defining planes through a central axis of said rotor shaft that are forty-five space degrees radially out of phase with each other; and a pair of stator assemblies disposed longitudinally along a common axis within said tubular housing and turned to each other by ninety spaced degrees about said common axis, said stator assemblies each being provided with means to provide a magnetic path therethrough, each stator assembly including alternating current field means adapted to excite an alternating, pulsating field of magnetic flux in the region of said magnetic paths provided by an associated stator assembly and rotor laminate, wherein said alternating current field means includes a spool traverse to and encircling said rotor shaft, said spool being wound with a plurality of turns of electrically conductive wire, and said magnetic paths of each stator assembly including a pair of spaced, opposed annular pole pieces axially aligned to each other and adapted to receive said rotor shaft therethrough.

References Cited in the file of this patent

UNITED STATES PATENTS 3,017,553   Homan _____ Jan. 16, 1962